United States Patent
Motomura

(10) Patent No.: US 6,778,769 B2
(45) Date of Patent: Aug. 17, 2004

(54) CAMERA

(75) Inventor: Katsumi Motomura, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/679,415

(22) Filed: Oct. 7, 2003

(65) Prior Publication Data

US 2004/0071458 A1 Apr. 15, 2004

(30) Foreign Application Priority Data

Oct. 11, 2002 (JP) .................................... 2002-299130
Jan. 31, 2003 (JP) .................................... 2003-024302

(51) Int. Cl.$^7$ .............................................. G03B 15/95
(52) U.S. Cl. ........................ 396/61; 396/158; 396/159
(58) Field of Search ......................... 396/61, 157–159; 315/241 P

(56) References Cited

U.S. PATENT DOCUMENTS 5,587,644 A * 12/1996 Masaki ...................... 396/205
5,822,628 A * 10/1998 Sato et al. .................. 396/159
5,956,535 A * 9/1999 Tohyama .................... 396/159
6,085,040 A * 7/2000 Yasukawa ................... 396/61

FOREIGN PATENT DOCUMENTS

| JP | 07-092371 A | 4/1995 |
| JP | 07-120813 A | 5/1995 |
| JP | 11-052460 A | 2/1999 |
| JP | 2002-072311 A | 3/2002 |

* cited by examiner

Primary Examiner—W. B. Perkey
(74) Attorney, Agent, or Firm—Sughrue Mion, PLLC

(57) ABSTRACT

A computation expression is stored by which an emission time period for obtaining a predetermined amount of emitted light is obtained by using temperature as a variable. An emission time period is obtained from a temperature on the basis of this computation expression. When a red-eye prevention mode is selected and when preliminary light emission and main light emission are performed continuously, the emission time period for main light emission is adjusted by detecting the voltage across a main capacitor through a voltage monitor. If a reference emission time period Tf is shorter than a predetermined time period of 30 μsec, the emission time is adjusted according to information including t0 corresponding to an emission delay time.

9 Claims, 11 Drawing Sheets

CAMERA

BACKGROUND OF THE INVENTION

1. Field of the Invention

The present invention relates to a camera having a flash emission device which emits flashing light and used to take a picture of a subject.

2. Description of the Related Art

Many cameras have a flash emission device which emits flashing light toward a subject. From such cameras, flashing light is emitted in synchronization with a picture-taking operation. When this flash photography is performed, the aperture to be set when a picture is taken is determined on the basis of the luminance of field, film speed information about a loaded film, etc., and the amount of flashing light is adjusted according to the aperture. Thus, the amount of light applied to the film is optimized by adjusting the amount of flashing light.

Methods of adjusting the amount of light include a method of adjusting the amount of light through the time period during which flashing light is emitted.

In a camera having a flash emission device using this method, however, a phenomenon occurs in which if the temperature of a certain portion decreases after adjustment of the amount of flashing light through the control of emission time, the amount of emitted light becomes smaller than a target amount, and in which if the temperature rises, the amount of emitted light becomes larger than the target amount. When this phenomenon occurs, there is a possibility of failure to obtain the desired exposure.

This is because the internal resistance of a capacitor provided in the flash emission device and used for emitting flashing light, etc., change when the temperature changes.

A camera has therefore been proposed in which temperature is detected and flashing light is emitted for an emission time period selected by considering the detected temperature information (see, for example, Patent Document 1).

In the proposed camera, a reference table in which predetermined emission time periods are set with respect to predetermined temperature ranges and amounts of flashing light determined according to distance information and film speed information. In this camera, an emission time period determined by considering temperature information as well as other kinds of information is obtained from the reference table and, therefore, the target amount of flashing light can be emitted with stability.

Patent Document 2 also proposes a related technique, which discloses to a focal-point-detecting preliminary lighting device for emitting auxiliary flashing light when detecting a distance to a subject. Specifically, this document discloses a technique for variably setting the amount of emitted light at the time of measurement by detecting a charging voltage during emission of flashing light for emitting auxiliary light toward the subject.

Also, there is a possibility of stoppage of flashing due to a reduction in voltage across a main capacitor when a focal plane shutter is made to travel. A camera is known in which such stoppage of flashing is prevented in such a manner that the luminous intensity of emitted flashing light is made constant over the exposure time and the amount of emitted light is uniformly applied to the entire film, although the amount of light becomes slightly short (see Patent Document 3).

[Patent Document 1]
  Japanese Patent Laid-Open No. 2002-72311
[Patent Document 2]
  Japanese Patent Laid-Open No. 7-92371
[Patent Document 3]
  Japanese Patent Laid-Open No. 7-120813

In the camera proposed in Patent Document 1, emission of a target amount of flashing light may be stabilized with high accuracy in such a manner that the above-mentioned temperature ranges are further divided into narrower temperature ranges and different flashing times are set in a one-to-one relationship with the narrower temperature ranges. However, such subdividing of the temperature ranges is limited due to memory capacity.

Some cameras have a red-eye prevention mode which is provided for prevention or reduction of red-eye flash photography and in which a preliminary flash is generated immediately before taking a picture and a main flash is thereafter generated in synchronization with a picture-taking operation. When flash photography is performed by setting the red-eye prevention mode in this type of camera, the voltage across a main capacitor is reduced by generation of a preliminary flash. Therefore it is difficult to set a suitable amount of light for a main flash.

Patent Document 1 shown above discloses a technique for correcting the emission time according to the temperature inside the camera. However, this technique is irrelevant to correction of variation in the amount of light due to a reduction in the voltage across the main capacitor.

According to Patent Document 2 shown above, the amount of emitted auxiliary light is changed by detecting the voltage across a capacitor in a flash emission means. However, this is a technique for roughly changing the amount of emitted light based on comparison of the voltage across the capacitor with a plurality of threshold values. This technique cannot be used for flash photography.

According to Patent Document 3, the voltage across a main capacitor in a flash is also detected for correction, and the luminous intensity of emitted light is controlled so that emission of light from the flash is maintained during the emission time determined by the curtain speed and the shutter speed of a focal plane shutter, while a slight deficiency of the amount of exposure is allowed. A suitable amount of light during main light emission cannot be obtained by using this technique.

SUMMARY OF THE INVENTION

In view of the above-described circumstances, an object of the present invention is to provide a camera devised in such a manner that flash emission time periods are set in correspondence with small differences in temperature to maintain with high accuracy a target amount of flashing light to be emitted.

Another object of the present invention is to provide a camera capable of optimizing the amount of emitted flashing light in a main flash even in a case where preliminary light emission and main light emission are continuously performed.

To achieve the above-described objects, according to a first aspect of the present invention, there is provided a camera which takes a picture of a subject, the camera including a flash emission device which emits flashing light in synchronization with a picture-taking operation, and which controls the amount of emitted light by selecting an emission time period, the flash emission device having a temperature sensor which detects temperature, a storage section which stores a computation expression by which an emission time period for obtaining a predetermined amount of emitted light is obtained by using temperature as a variable, and an emission control section which obtains an emission time period from the temperature obtained from the temperature sensor on the basis of the computation expression, and which controls the emission time period so that light is emitted only for the obtained emission time period.

In the camera according to the first aspect of the present invention, the target amount of emitted light is ensured by making the flash emission device emit light for the emission time period obtained by the computation expression using the temperature as a variable. That is, in the camera according to the first aspect of the present invention, constants of the computation expression can be stored in a memory. That is, in the camera according to the first aspect of the present invention, if constants of the computation expression are stored in a memory, flash emission time periods corresponding to small differences in temperature can be set by using the detected temperature as a variable. Therefore the camera according to the first aspect of the present invention is capable of maintaining the target amount of emitted flashing light with improved accuracy in comparison with the conventional camera using the same memory capacity.

Preferably, the computation expression is represented by an expression including a linear expression in each of temperature ranges and expressed by a polygonal line as a whole.

This computation expression is capable of finely setting the emission time period with respect to variation in temperature without considerably sacrificing the accuracy in comparison with an expression of a higher order.

To solve the above-described problem, according to a second aspect of the present invention, there is provided a camera which takes a picture of a subject, the camera including a flash emission device which performs preliminary light emission before a picture-taking operation, and which performs main light emission in synchronization with the picture-taking operation, the flash emission device having a main capacitor in which charge for emission of flashing light is accumulated, a light emitting section which emits flashing light by receiving electric power from the main capacitor, a voltage monitor which detects the voltage across the main capacitor before the main light emission, an emission time computation section which obtains, on the basis of the detected voltage obtained by the voltage monitor, an emission time period such that the same amount of light as the amount of light when flashing light is emitted for a predetermined reference emission time period when the voltage across the main capacitor is equal to a predetermined reference voltage can be obtained, and an emission control section which controls light emission so that flashing light is emitted only for the emission time period obtained by the emission time computation section.

In the camera according to the second aspect of the present invention, when main light emission is performed in synchronization with a picture-taking operation after preliminary light emission has been performed before the picture-taking operation, an emission time period such that the same amount of light as the amount of light when flashing light is emitted for a predetermined reference emission time period when the voltage across the main capacitor is equal to a predetermined reference voltage can be obtained is computed by the emission time computation section on the basis of the detected voltage obtained by the voltage monitor, and the emission time period is adjusted. Emission of flashing light is controlled by the emission control section so that flashing light is emitted only for the adjusted emission time period. Thus, the emission time period for main light emission is adjusted according to the voltage across the main capacitor when preliminary light emission and main light emission is continuously performed, thereby optimizing the amount of light at the time of main light emission.

Preferably, in camera according to the second aspect of the present invention, the aperture at the time of main light emission is variable and the reference emission time period is a time period according to the aperture at the time of main light emission.

"The time of main light emission" refers to a time at which main light emission is actually performed, and actual examples are as follows. Some cameras have, for example, a programmable shutter having the function of setting an aperture and being gradually opened with the passage of time to reach the maximum opening. With respect to a type of camera in which main light emission is performed when a shutter gradually opened and has an aperture diameter according to the subject distance and the subject luminance, "the time of main light emission" corresponds to the time at which this aperture is reached.

A type of camera in which main light emission is performed always when the maximum opening is reached may be such that, for example, a zoom lens is provided and the aperture diameter at the maximum opening varies depending on the zooming position of the zoom lens. In such a case, "the aperture at the time of main light emission" is the maximum opening according to the zooming position in a picture-taking operation using the main light emission. The present invention can also be applied to a type of camera in which an aperture and a shutter are provided separately from each other, and "the aperture at the time of main light emission" refers to the aperture diameter at which main light emission is performed in a picture-taking operation.

Thus, in a camera using a variable-aperture programmable shutter, the emission time period can be correctly adjusted to a time period according to the aperture at the time of main light emission.

Preferably, the camera has a temperature sensor which detects temperature, and the reference emission time period is a time period according to the temperature detected by the temperature sensor.

In such a case, flashing light can be emitted for an emission time period according to the temperature of the camera, and the amount of light can be optimized even when the temperature of the camera changes.

Further, preferably, the camera has a distance sensor which detects a subject distance, and the reference emission time period is a time period according to the subject distance detected by the distance sensor.

In such a case, the emission time period can be accurately adjusted to a time period according to the subject distance.

Preferably, the above-described emission time computation section stores a computation expression by which the time period from the emission start instruction to the emission stop instruction is obtained. Also, if the reference emission time period is Tf; the reference voltage is Vf; the detected voltage is V; a constant corresponding to a time delay from a moment at which an emission start instruction is issued to a moment at which light emission is started is t0; and the emission time period is T, the emission time computation section obtains the emission time period T by $$T = (Tf - t0) \times (Vf/V) + t0 \qquad (1)$$

In this manner, the emission time period can be computed by considering the detected voltage V and the constant t0 corresponding to a time delay from a moment at which an emission start instruction is issued to a moment at which light emission is started.

Preferably, when the reference emission time period Tf is longer than a predetermined time period T1 of 30 μsec or longer, the emission time computation section obtains the emission time period T by $$T = Tf \times (Vf/V) \qquad (2)$$

instead of the equation (1).

When the emission time period T is longer than the predetermined time period T1, 30 μsec in this case, the emission time period obtained by the equation (2) is substantially the same as that obtained by the equation (1). Therefore the emission time period is computed by the equation (2). The computation in the emission time computation section is thereby simplified to reduce the load on the emission time computation section.

As described above, in the camera according to the first aspect of the present invention, flash emission times can be finely set with respect to small variations in temperature and a target amount of emitted flashing light can be maintained with higher accuracy in comparison with the conventional cameras.

In the camera according to the second aspect of the present invention, the amount of emitted flashing light in a main light emission can be optimized even in a case where preliminary light emission and main light emissions are performed continuously.

BRIEF DESCRIPTION OF THE DRAWINGS

FIG. 6 is a flowchart of a routine started when the camera of the first embodiment is powered on;

DETAILED DESCRIPTION OF THE PREFERRED EMBODIMENTS

Cameras which represent embodiments of the present invention will be described.

Figure 1:
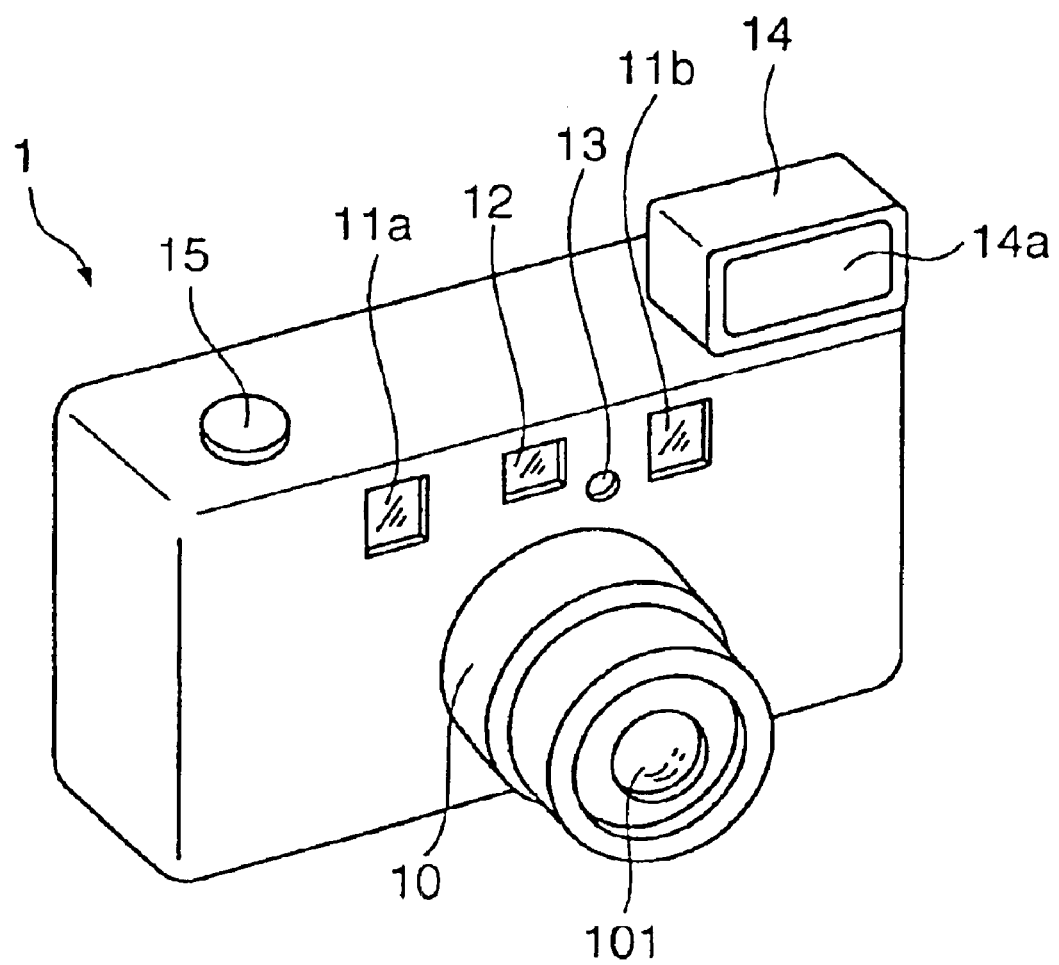
FIG. 1 is an external perspective view of a camera which represents a first embodiment of the present invention, the camera being viewed obliquely from a position at the front side.

FIG. 1 is an external perspective view of a camera which represents a first embodiment of the present invention, the camera being viewed obliquely from a position at the front side.

The camera 1 shown in FIG. 1 has, at a center of its front side, a lens barrel 10 incorporating a front lens 101 constituting a zoom lens, and has a light projecting window 11a and a light receiving window 11b for distance metering, a finder objective window 12 and an automatic exposure (AE) receiving window 13 provided above the lens barrel. The lens barrel 10 is extended or retracted according to an operation moving a zoom lever (not shown).

On an upper surface of the camera 1 shown in FIG. 1, a release button 15 is provided at the right-hand side (at the left-hand side as viewed in FIG. 1), and a flash emitting section 14 is provided at the left-hand side (at the right-hand side as viewed in FIG. 1). A flash emission window 14a is fitted in a front surface of the flash emitting section. The release button 15 is of a two-step type such that it is half pushed and fully pushed. In the half pushed state, light metering and distance metering are performed. In the fully pushed state, flash photography or ordinary photography is performed on a roll of film according to luminance information obtained by light metering. On a back surface of the camera 1 shown in FIG. 1 are provided a finder ocular window for checking the angle of view, a zoom lever which is operated when zooming is performed, and a light emitting mode selection button which is operated for selection as to whether flash photography is performed in an normal light emitting mode or in a red-eye prevention mode. The zoom lever and light emitting mode selection button will be described later using FIG. 2.

Figure 2:
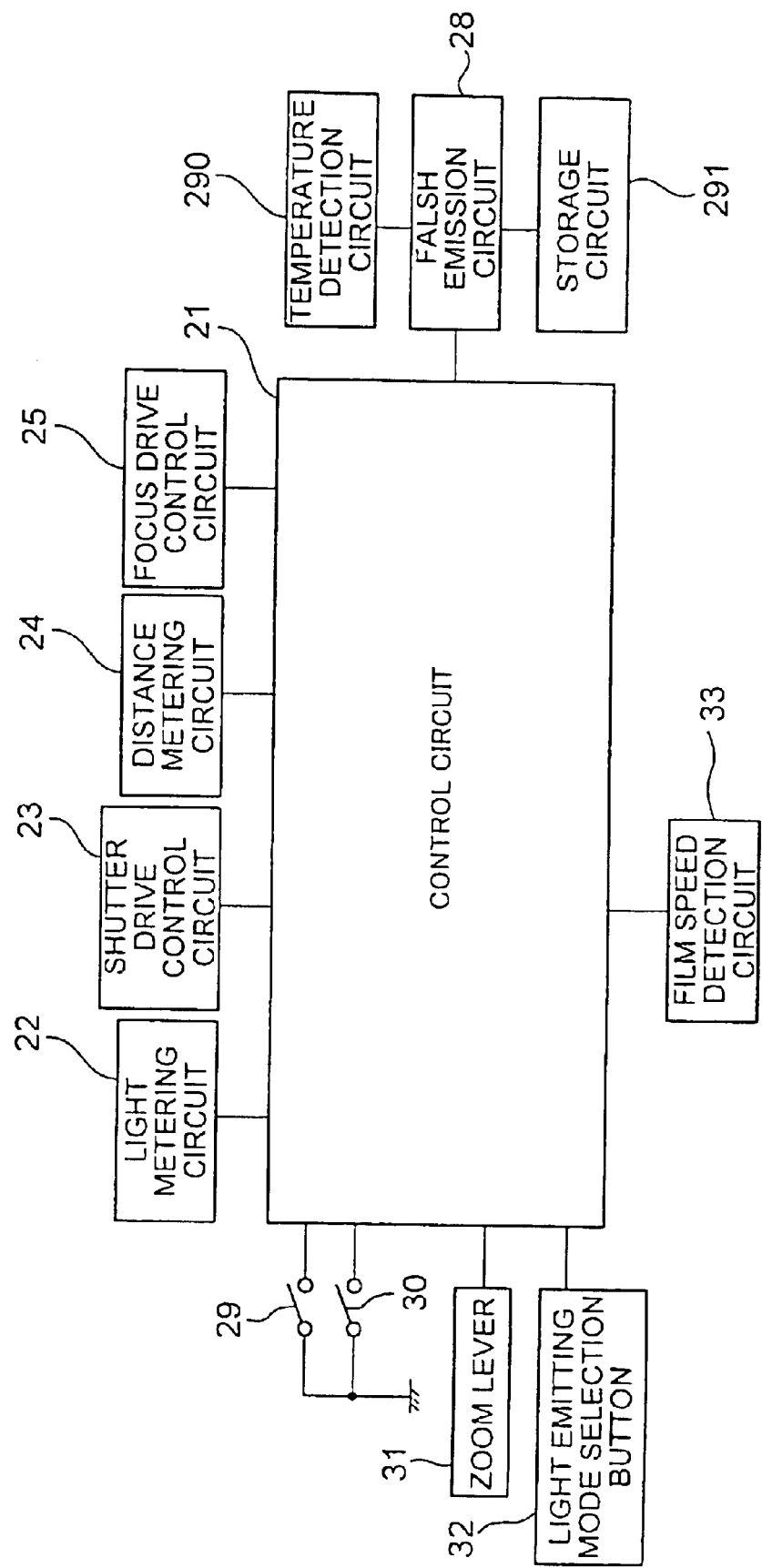
FIG. 2 is a block diagram showing internal sections of the camera of the first embodiment.

FIG. 2 is a block diagram showing internal sections of the camera of the present embodiment.

FIG. 2 shows a control circuit 21 for overall control of the camera 1, a light metering circuit 22 for detecting the luminance of field, a shutter drive control circuit 23 for controlling opening/closing of a shutter having the function of setting an aperture, a distance metering circuit 24 for measuring the distance to a subject, a focus drive control circuit 25 for focusing the picture-taking lens by driving the lens on the basis of distance metering information obtained by the distance metering circuit, a flash emission circuit 28 for emitting flashing light, and a film speed detection circuit 33 for detecting the film speed of a loaded film. The flash emission circuit 28 includes a temperature detection circuit 290 for detecting temperature and a storage circuit 291 in which the gradient and intercept of a linear expression as described below for details or the like are stored.

FIG. 2 also shows a light metering and distance metering switch 29 which is turned on when the shutter button 15 is half pushed, a picture-taking switch 30 which is turned on when the shutter button 15 is fully pushed, the zoom lever 31 which is operated when zooming is performed, and the light emitting mode selection button 32. A feed mechanism for feeding the film after exposure and other components are not shown in FIG. 2.

Figure 3:
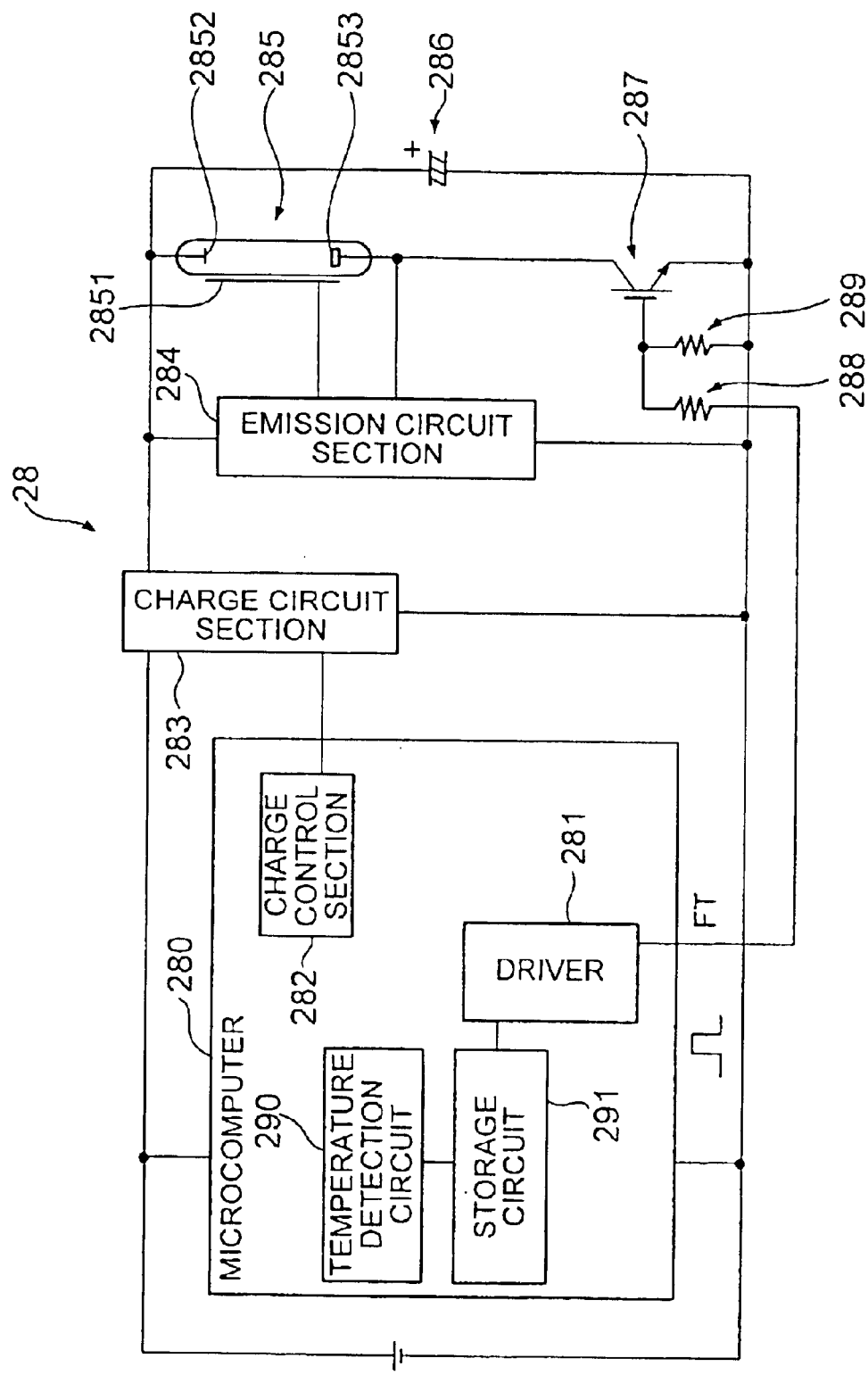
FIG. 3 is a diagram schematically showing the configuration of a flash emission circuit shown in FIG. 2.

FIG. 3 is a diagram schematically showing the configuration of the flash emission circuit shown in FIG. 2.

FIG. 3 shows, as components of the flash emission circuit 28, a microcomputer 280 for overall control of the flash emission circuit, the temperature detection circuit 290, the storage circuit 291, a main capacitor 286 in which charge for light emission is accumulated, a driver 281 which controls the time period during which flashing light is emitted, a charge control section 282 which detects a charge voltage and issues a charge instruction to a charge circuit section, the charge circuit section 283 which receives the instruction from the charge control section and charges the main capacity, a light emitting section 285 having a xenon tube for emitting flashing light, an insulated gate bipolar transistor (IGBT) switching device 287 for releasing charge from the main capacitor under the control of the driver, and an emission circuit section 284 having a trigger coil (not shown) for applying a trigger voltage to a side surface electrode 2851 in the light emitting section.

The driver 281 is connected to the base of the IGBT switching device 287 via a resistor element 288.

The light emitting section 285 is constituted by an anode electrode 2852, a cathode electrode 2853 and the side surface electrode 2851. The anode electrode 2852 is connected to the emission circuit section 284, to the plus terminal of the main capacitor 286, and the cathode electrode 2853 is connected to the emission circuit section 284 and to the collector of the IGBT switching device 287.

The emitter of the IGBT switching device 287, the light emitting circuit section and a resistor element 289 connected to the base of the IGBT switching device 287 are connected to the minus terminal of the main capacitor 286. The minus terminal of the main capacitor 286, connected to these components, is also connected to the minus terminal of a battery.

The flow of the picture-taking operation of the camera 1 in this embodiment will be described with reference to FIGS. 2 and 3.

When the shutter button 15 of the camera 1 is half pushed, luminance information from the light metering circuit 22, distance information from the distance metering circuit 24 and film speed information from the film speed detection circuit 33 are obtained.

In this camera 1, an exposure is first determined on the basis of luminance information and film speed information, an aperture and a shutter speed are determined, and a determination is made as to whether or not emission of flashing light is required. If it is determined that emission of flashing light is required, an amount of flashing light to be emitted is determined on the basis of the distance information and the film speed information.

In the camera 1 of this embodiment, the amount of light emitted by flash emission device having a predetermined guide number is controlled by selecting an emission time period determined by considering information including temperature information. A flash time period in which temperature information is reflected is determined in such a manner that temperature information is given as a variable for a linear expression stored in a reference table stored in the storage circuit and the linear expression is computed. Emission of flashing light is started when the shutter having the function of setting an aperture has a predetermined opening diameter. The above-mentioned reference table is shown as Table 1 below.
[Table 1]

In Table 1, a state in which an emission time period according to an amount of flashing light to be emitted determined on the basis of distance information, etc., is set according to temperature is expressed by the emission time period or a linear expression for deriving the emission time period.

The ordinate of Table 1 represents the relative amount of light to be emitted (amount of attenuation) in a case where the full emission from the flash emission device provided in the camera 1 corresponds to an EV value "0.0". An EV value "−1.0" represents an amount of light which is half the amount of light at the time of full emission, and an EV value "−2.0" represents an amount of light which is half the amount of light represented by the EV value "−1.0", i.e., ¼ of the amount of light at the time of full emission.

On the abscissa of Table 1, temperatures divided into six categories are indicated.

The amount of flashing light to be emitted is determined as the amount of attenuation indicated by the EV value as described above.

For instance, in a case where the determined amount of flashing light to be emitted is indicated by the EV value "−3.0", the emission time period is determined to be 120 $\mu$s when the temperature is −11° C. When the temperature is −7° C., the computation expression is −4.666× (temperature)+54.7 and the emission time period is 87.362 $\mu$s. When the temperature is equal to or higher than 35° C., the emission time period is 35 $\mu$s. As the temperature increases, the emission time period becomes shorter. In the lowermost section of Table 1, it is shown that the emission time period for preliminary emission of flashing light performed before the main picture-taking operation in a case where the above-mentioned red-eye prevention mode is selected is also adjusted with respect to temperature.

In the camera 1 of this embodiment, as described above, the method of emitting flashing light during the emission time period derived by considering information including temperature information is carried out in order that emission of the determined amount of flashing light to be emitted can be executed with accuracy at any temperature.

Figure 4:
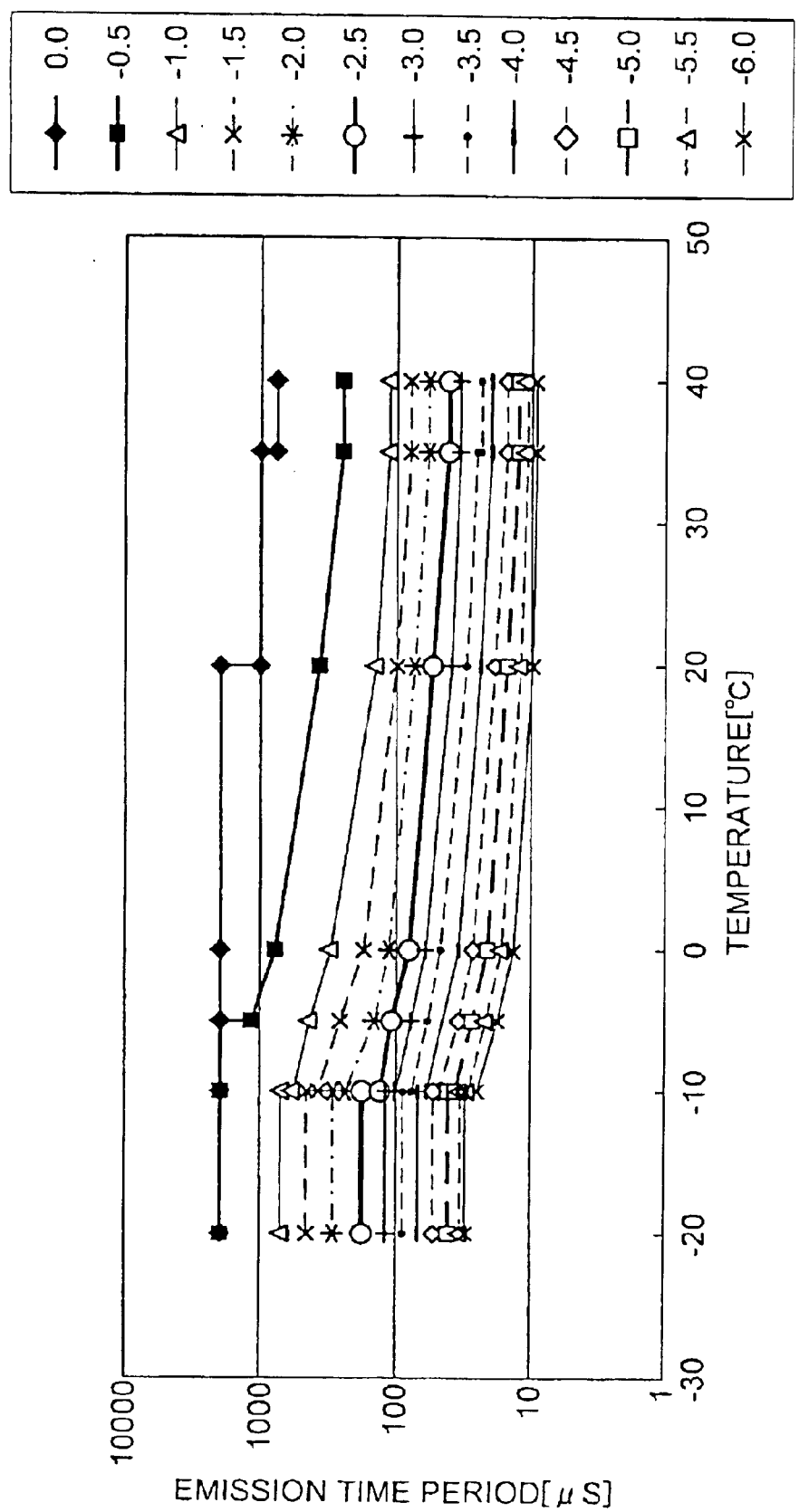
FIG. 4 is a graph showing changes in time with respect to temperature and with respect to each of the amounts of emission of light shown in Table 1.

FIG. 4 is a graph showing changes in time with respect to temperature and with respect to each of the amounts of emission of light shown in Table 1.

In FIG. 4, the ordinate represents the emission time period, the abscissa represents temperature, and changes with respect to temperature in the emission time according to the amount of flashing light to be emitted, determined on the basis of distance information obtained by the distance metering circuit, etc., are shown.

TABLE 1

| Amount of Attenuation (EV) | Emission Time Period ($\mu$s) | | | | | |
|---|---|---|---|---|---|---|
| | −10° C. or lower | −10 to −5° C. | −5 to 0° C. | 0 to 20° C. | 20 to 35° C. | 35° C. or higher |
| 0.0 | Y = 2000 | y = 2000 | y = 2000 | y =2000 | y = 1000 | y =800 |
| −0.5 | y = 2000 | y = 2000 | y = −73.622x + 724.39 | y = −16.97x + 724.39 | y = −7.576x + 536.52 | y = 260 |
| −1.0 | y = 750 | y = −28.378x + 324.93 | y = −27.304x + 330.3 | y = −8.856x + 330.3 | y = −2.02x + 193.58 | y = 120 |
| −1.5 | y = 470 | y = −21.182x + 151.51 | y = −15.544x + 179.7 | y = −3.8295x + 179.7 | y = −1.1567x + 126.24 | y = 82 |
| −2.0 | y = 290 | y = −16.14x + 54.6 | y = −4.394x + 113.33 | y = −1.9925x + 113.33 | y = −0.8433x + 90.347 | y = 60 |
| −2.5 | y = 180 | y = −5.818x + 75.76 | y = −4.606x + 81.82 | y = −1.4015x + 81.82 | y = −0.6113x + 66.017 | y = 43 |
| −3.0 | y = 120 | y = −4.666x + 54.7 | y = −3.546x + 60.3 | y = −1.0265x + 60.3 | y = −0.3887x + 47.543 | y = 35 |
| −3.5 | y = 85 | y = −3.456x + 41.96 | y = −2.758x + 45.45 | y = −0.7195x + 45.45 | y = −0.3133x + 37.327 | y = 25 |
| −4.0 | y = 70 | y = −2.728x + 31.81 | y = −2.06x + 35.15 | y = −0.538x + 35.15 | y = −0.232x + 29.03 | y = 21 |
| −4.5 | y = 53 | y = −2.122x + 24.84 | y = −1.544x + 27.73 | y = −0.417x + 27.73 | y = −0.1813x + 23.017 | y = 16.5 |
| −5.0 | y = 42 | y = −1.622x + 19.99 | y = −1.242x + 21.89 | y = −0.314x + 21.89 | y = −0.1313x + 18.237 | y = 13.5 |
| −5.5 | y = 34 | y = −1.304x + 15.6 | y = −0.94x + 17.42 | y = −0.25x + 17.42 | y = −0.0907x + 14.233 | y = 11 |
| −6.0 | y = 30 | y = −0.97x + 12.42 | y = −0.734x + 13.6 | y = −0.1725x + 13.6 | 10 | y = 9 |
| Red-eye | | y = 70 | | | y = 38 | y = 30 |

After the emission time has been determined in this manner, full-push of the shutter button 15 is awaited. When the shutter button 15 is fully pushed, the picture-taking lens moves to the in-focus position and the control circuit 21 sends a pulse signal output instruction to the driver 281 for driving the flash emission circuit shown in FIG. 3. The driver 281 outputs a pulse signal. The output pulse is input to the base of the IGBT switching device 287 via the resistor element 288. The assertion time of this pulse signal is determined so that the emission time period for emission of flashing light performed as described below is equal to the time period determined by reference to the reference table or the like.

Figure 5:
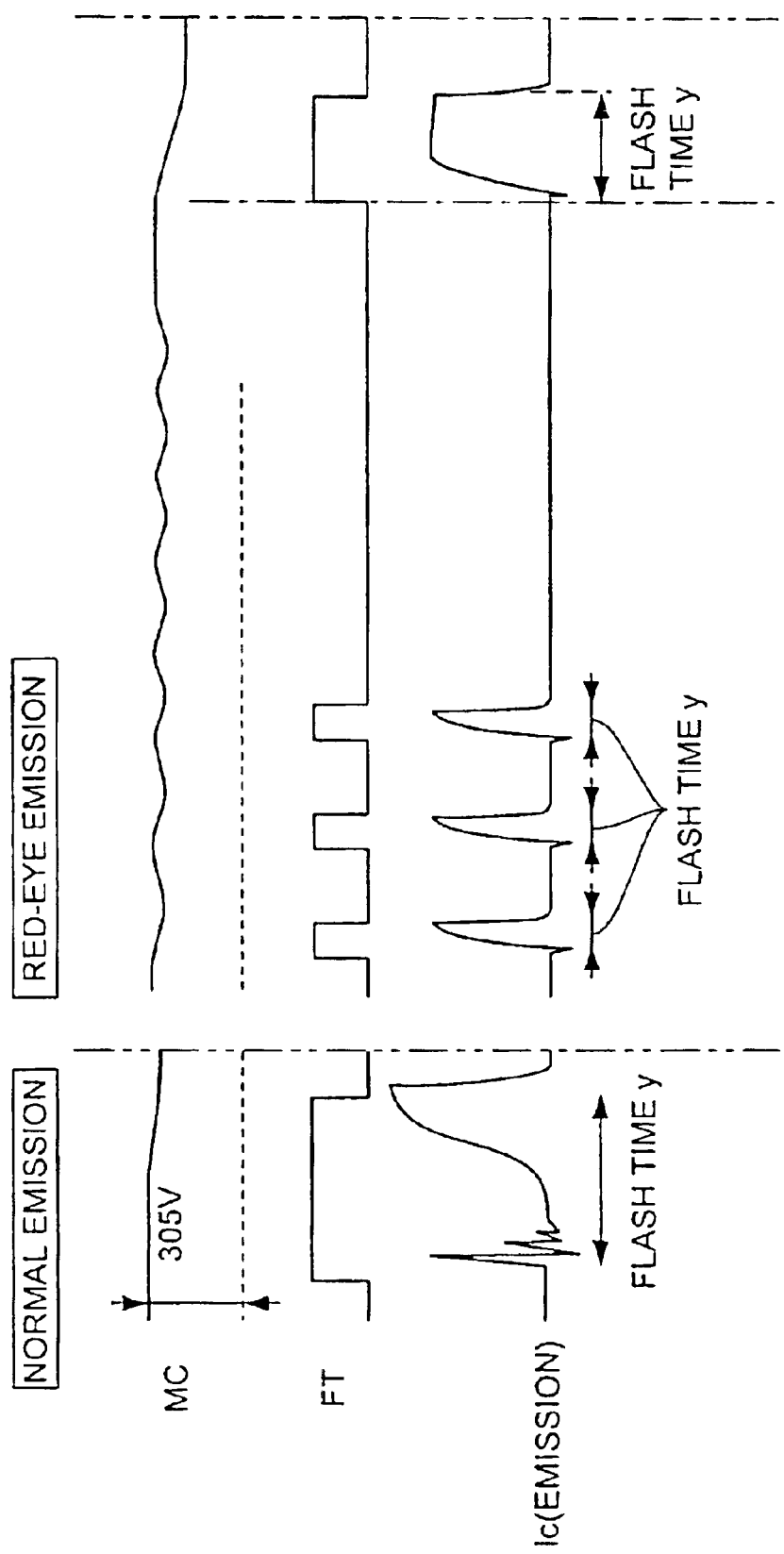
FIG. 5 is a diagram showing, in upper to lower stages, the voltage across a main capacitor, a pulse signal input to a IGBT switching device, and discharge current of the main capacitor, i.e., emission waveform Ic.

FIG. 5 is a diagram showing, in upper to lower stages, the voltage across the main capacitor, the pulse signal input to the IGBT switching device, and the discharge current of the main capacitor, i.e., emission waveform Ic.

In the left-hand section of FIG. 5, the waveforms of the above-described voltage, signal and current when the normal light emitting mode of flash photography is selected are shown. In the right-hand section of FIG. 5, the waveforms of the above-described voltage, signal and current when the red-eye prevention mode is selected are shown.

In the case of ordinary light emission, the IGBT switching device 287 is turned on when the pulse signal FT is asserted. Charge accumulated in a capacitor for triggering (not shown) provided in the emission circuit section 284 is then discharged in a loop formed by the IGBT switching device and a primary winding of the trigger coil (not shown) also provided in this emission circuit section. A current is thereby caused to flow through the primary winding and a large electromotive force is excited on the secondary winding side where the number of turns is larger than that of the primary winding. This large electromotive force is applied as a trigger voltage to the side surface electrode 2851 in the light emitting section 285, a current flows from the plus side of the main capacitor 286 and the anode electrode 2852 of the xenon tube to the cathode electrode 2853 of the xenon tube and to the IGBT switching device 287, and the xenon tube emits light.

In the case of emission in the red-eye prevention mode, assertion and negation by the above-described pulse wave are repeated three times to perform emission of light in short emission time periods. Main light emission is thereafter performed. The way in which light is emitted at the time of main light emission is the same as that described above and, therefore, will not be described. In FIG. 5, a state in which the main capacitor is charged so that the voltage MC across the main capacitor is about 305 V is shown.

Figure 6:
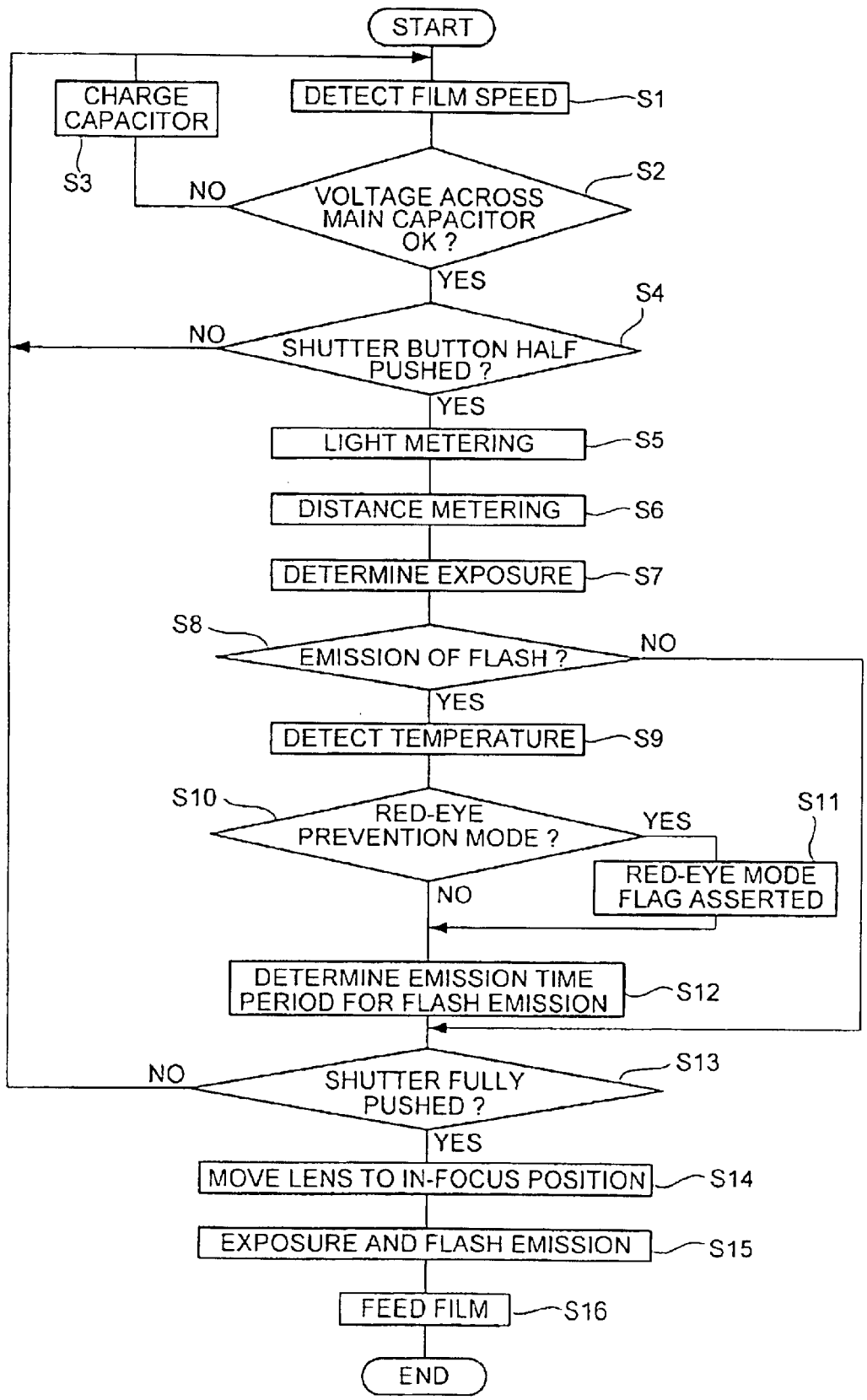

FIG. 6 is a flowchart of a routine started when the camera of this embodiment is powered on.

In step S1, the speed of a film loaded in the camera 1 is detected.

In step S2, a determination is made as to whether or not a prescribed value has been reached by the voltage across the main capacitor 286 in the flash emission circuit 28. If it is determined in step S2 that the prescribed voltage value has not been reached, the process advances to step S3 and charging is started. The process then returns to step S1.

If it is determined in step S2 that the prescribed value has been reached, the process advances to step S4 and a determination is made as to whether or not the shutter button 15 has been half pushed.

If it is determined in step S4 that the shutter button 15 has not been half pushed, the process returns to step S1. If it is determined that the shutter button 15 has been half pushed, the process advances to step S5.

In step S5, light metering is performed by the light metering circuit. In step S6, distance metering is performed by the distance metering circuit. Thereafter, in step S7, an exposure is determined on the basis of luminance information obtained by light metering and the film speed information. The process then advances to step S8.

In step S8, a determination is made from the luminance information as to whether or not emission of flashing light is necessary. If it is determined in step S8 that emission of flashing light is unnecessary, the process advances to step S13 for ordinary photography. If it is determined that emission of flashing light is necessary, the process advances to step S9 and detection of temperature information by the temperature detection circuit 290 is performed. Thereafter the process advances to step S10 and a determination is made as to whether the red-eye prevention mode is selected.

If it is determined in step S10 that the red-eye prevention mode is selected, the process advances to step S11 and a red-eye prevention flag is asserted.

If it is determined in step S10 that the red-eye prevention mode is not selected, the process advances to step S12 and an emission time period is determined by referring to the reference table on the basis of information including distance information obtained by the distance metering circuit 24 and the above-mentioned temperature information.

Thereafter, the process advances to step S13 and a determination is made as to whether or not the shutter button 15 has been fully pushed. If it is determined in step S13 that the shutter button 15 has not been fully pushed, the process returns to step S1. If it is determined that the shutter button 15 has been fully pushed, the process advances to step S14 and the lens is moved to the in-focus position. Thereafter, in step S15, exposure is performed and emission of flashing light is also performed. In step S16, feed of the film is performed and this routine ends.

In the camera 1 of this embodiment, as described above, setting of an emission time period according to a small difference in temperature can be performed by using a detected temperature as a variable if the gradient and intercept of a linear expression are stored in the memory. Therefore, the camera 1 of this embodiment is capable of maintaining a target amount of flashing light to be emitted with improved accuracy in comparison with the conventional camera with respect to the same memory capacity. The computation expression in accordance with the present invention is not limited to a linear expression and the effect of the present invention is not reduced even in a case where a quadratic or cubic expression is used.

A camera which represents a second embodiment of the present invention will be described. In the second embodiment, both an example of the first aspect and an example of the second aspect of the present invention are realized.

Figure 7:
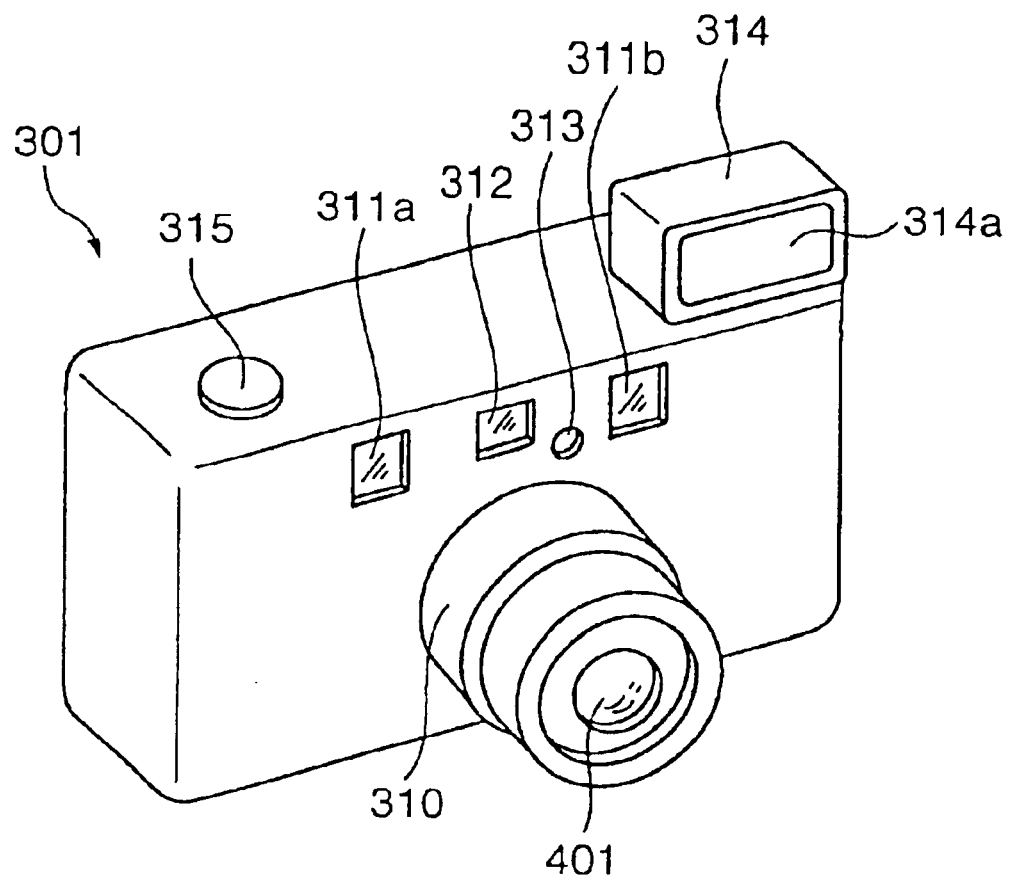
FIG. 7 is an external perspective view of a camera which represents a second embodiment of the present invention.

FIG. 7 is an external perspective view of the camera which represents the second embodiment of the present invention, the camera being viewed obliquely from a position at the front side.

The camera 301 shown in FIG. 7 has, at a center of its front side, a lens barrel 310 incorporating a picture-taking lens 401, and has a light projecting window 311a and a light receiving window 311b for distance metering, a finder 312 and an AE receiving window 313 provided above the lens barrel. The picture-taking lens 401 provided in the lens barrel 310 is a zoom lens formed by a plurality of lenses. The lens barrel 310 is moved forward or rearward along the direction of its optical axis according to the operation of a zoom lever (not shown) provided on the back side to change the relative positions of the plurality of lenses incorporated in the lens barrel, thereby adjusting the focal distance. A flash emitting section 314 is protrusively formed on an upper portion of the camera body, and a window for emitting flashing light is provided in the flash emitting section 314. A protector 314a for protecting a light emitting tube (not shown) provided in the flash emitting section is fitted in the window.

On an upper surface of the camera shown in FIG. 7, a release button 315 is provided. When the release button 315 is half pushed by a user, the luminance of field and the distance to a subject are detected by a light metering device and a distance metering device provided in the camera. At this time, light introduced into the camera through the AE receiving window 313 shown in FIG. 7 is supplied to a light metering section provided in the camera and the luminance of field is detected by the light metering section. Also, light from a light-projecting light source provided in the camera is projected toward the subject through the projection window 311a. The projected light strikes the subject and part of the projected light is thereby returned as return light. The return light enters the camera through the receiving window 311b to be detected by a distance sensor in the camera. The distance to the subject is measured through detection with the distance sensor.

An exposure is determined on the basis of the luminance of field, the film speed of a loaded photographic film, etc., and focusing is performed on the basis of the subject distance. A programmable shutter is provided in the camera of this embodiment and is driven according to the exposure.

Thereafter, when the release button 315 is fully pushed by the user, the programmable shutter is driven to perform photography. In a case where the luminance of field when the release button 315 is half-pushed to perform light metering is low and a control section described below determines that there is a need for emission of flashing light, the following operation is performed. An emission time period is determined on the basis of an aperture value at the time of emission of flashing light in the aperture formed by the programmable shutter and changing continuously with respect to time, the detected subject distance, etc., and flashing light is emitted for the determined emission time period toward the subject through the protector 314a provided in the flash emitting section 314.

This camera has light emitting modes such as a normal light emitting mode and a red-eye prevention mode. When the normal light emitting mode is selected with a light emitting mode selection button (not shown), emission of an ordinary flash is performed. When the red-eye prevention mode is selected, preliminary light emission and main light emission are continuously performed. At the time of preliminary emission, flashing light in pulse form is repeatedly emitted toward the subject in order that the human eyes can be accustomed to the flashing light. Transition to the main emission is thereafter made to emit flashing light toward the subject for a predetermined emission time period. This predetermined time period is obtained by a control section described below on the basis of information including temperature information and information on the voltage across the main capacitor as well as the above-mentioned aperture and subject distance, and flashing light is emitted for this time period.

Figure 8:
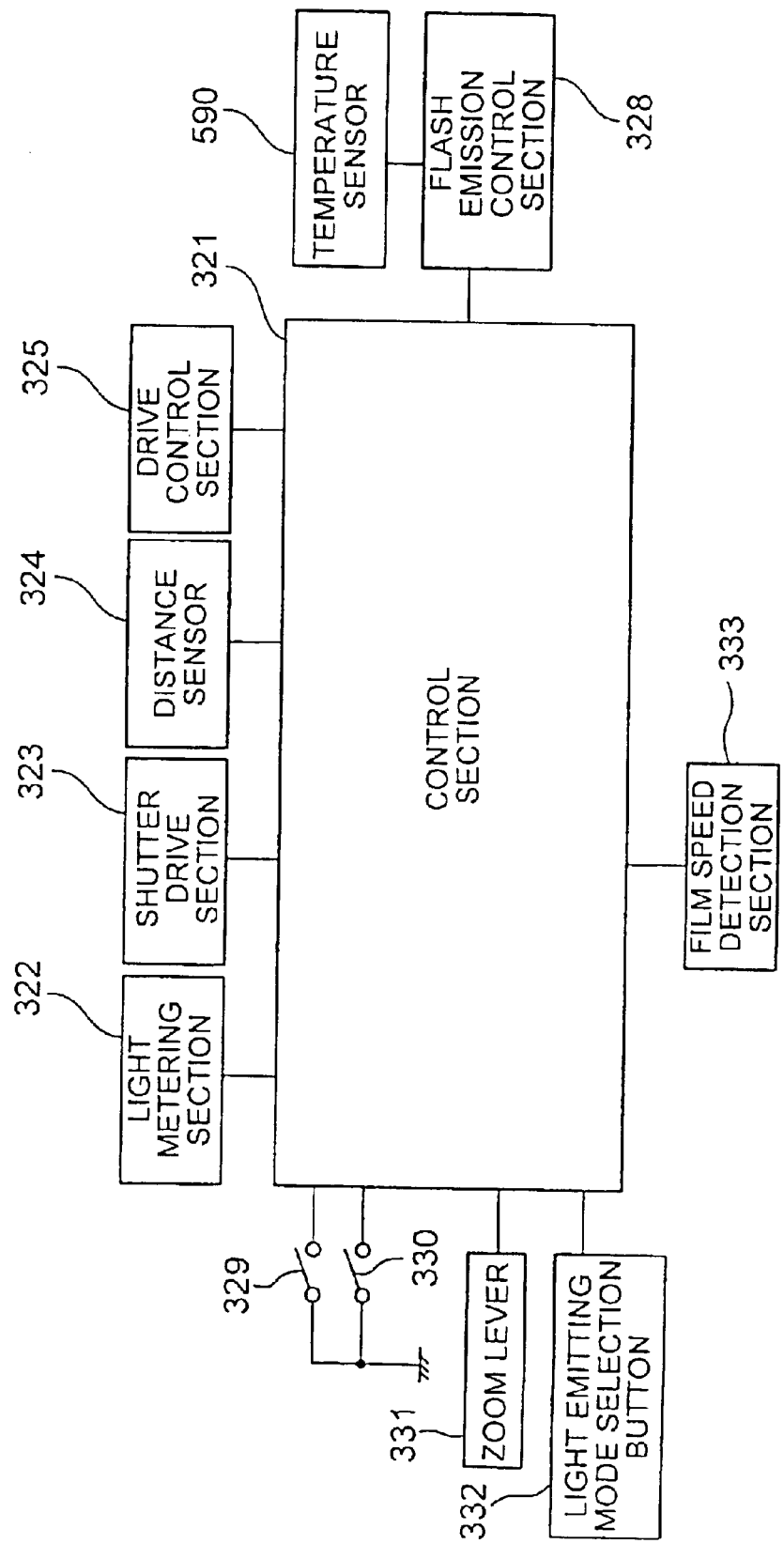
FIG. 8 is a block diagram showing the internal configuration of the camera of the second embodiment.

FIG. 8 is a block diagram showing the internal configuration of the camera of this embodiment.

FIG. 8 shows a control section 321 for overall control of the camera 301, a light metering section 322 for detecting the luminance of field, a shutter drive section 323 for controlling opening/closing of a shutter having the function of setting an aperture, a distance metering sensor 324 for measuring the distance to a subject, a drive control section 325 for focusing the picture-taking lens by driving the lens on the basis of the result of detection of the subject distance with the distance sensor 324, a flash emission control section 328 for emitting flashing light, and a film speed detection circuit 333 for detecting the film speed As shown in FIG. 8, the overall operation of the camera 301 of this embodiment is controlled by the control section 321. The release button of the camera 21 of this embodiment has two operating states: a half pushed state and a fully pushed state, as mentioned above. Two switches 329 and 330 for transmitting information according to these two operating states to the control section 321 are provided. When the release button 315 shown in FIG. 7 is half pushed, the switch 329 is closed and the control section 321 detects the half pushed state through the closed state of the switch 329. When the release button 315 shown in FIG. 7 is fully pushed, both the switch 329 and the switch 330 are closed and the control section 321 detects the fully pushed state through the closed state of the switches 329 and 330.

When the release button 315 is half pushed to close the switch 329, the control section 321 receives the result of measurement of the subject distance from the distance sensor 324, and issues an instruction to the drive control section 325 to drive the lens to the position according to the subject distance. The drive control section 325 receives this instruction and drives the focusing lens to the in-focus position.

The control section 321 also receives the result of measurement of the luminance of field from the light metering section 322 when the release button 315 is half pushed. An exposure is determined on the basis of this measurement result and the film speed from the film speed detection section 333. In this camera, a programmable shutter is used and aperture-shutter combinations according to exposures are determined. Therefore, when data indicating the film speed is supplied from the control section to the drive control section, the opening/closing state of the shutter is adjusted by the shutter drive section 323 according to the data when the release button is fully pushed.

If the control section 321 detects a low-luminance condition through light metering performed by the light metering section 322, it obtains an amount of attenuation from the amount of light in the case of full emission of flashing light on the basis of the aperture diameter at the time of light emission, the film speed and the subject distance, and notifies the flash emission control section 328 of the amount of attenuation. The flash emission control section 328 is provided with a temperature sensor 590 for detecting the temperature of an internal portion of the camera. The flash emission control section 328 obtains a reference emission time period on the basis of the notified amount of attenuation and the internal temperature. In the normal light emitting mode, the flash emission control section 328 emits flashing light for the reference emission time period after a moment at which the predetermined aperture diameter is reached while the shutter is being driven by the shutter drive section 323.

In the red-eye prevention mode, preliminary light emission is performed before opening of the shutter for the purpose of preventing a red-eye phenomenon. Subsequently, main light emission is performed when the predetermined aperture diameter is reached after opening of the shutter. Immediately before the main light emission, the voltage across the main capacitor MC (see FIG. 9) is monitored and an emission time period is again obtained on the basis of the reference emission time period obtained as described above, such that the same amount of emitted light as that in the case of light emission for the reference emission time when the voltage across the main capacitor is at a predetermined reference voltage can be obtained. Flashing light is emitted for the emission time period thus obtained. The above-mentioned zoom lever and mode selection button are also shown in FIG. 8 as 331 and 332 respectively.

Figure 9:
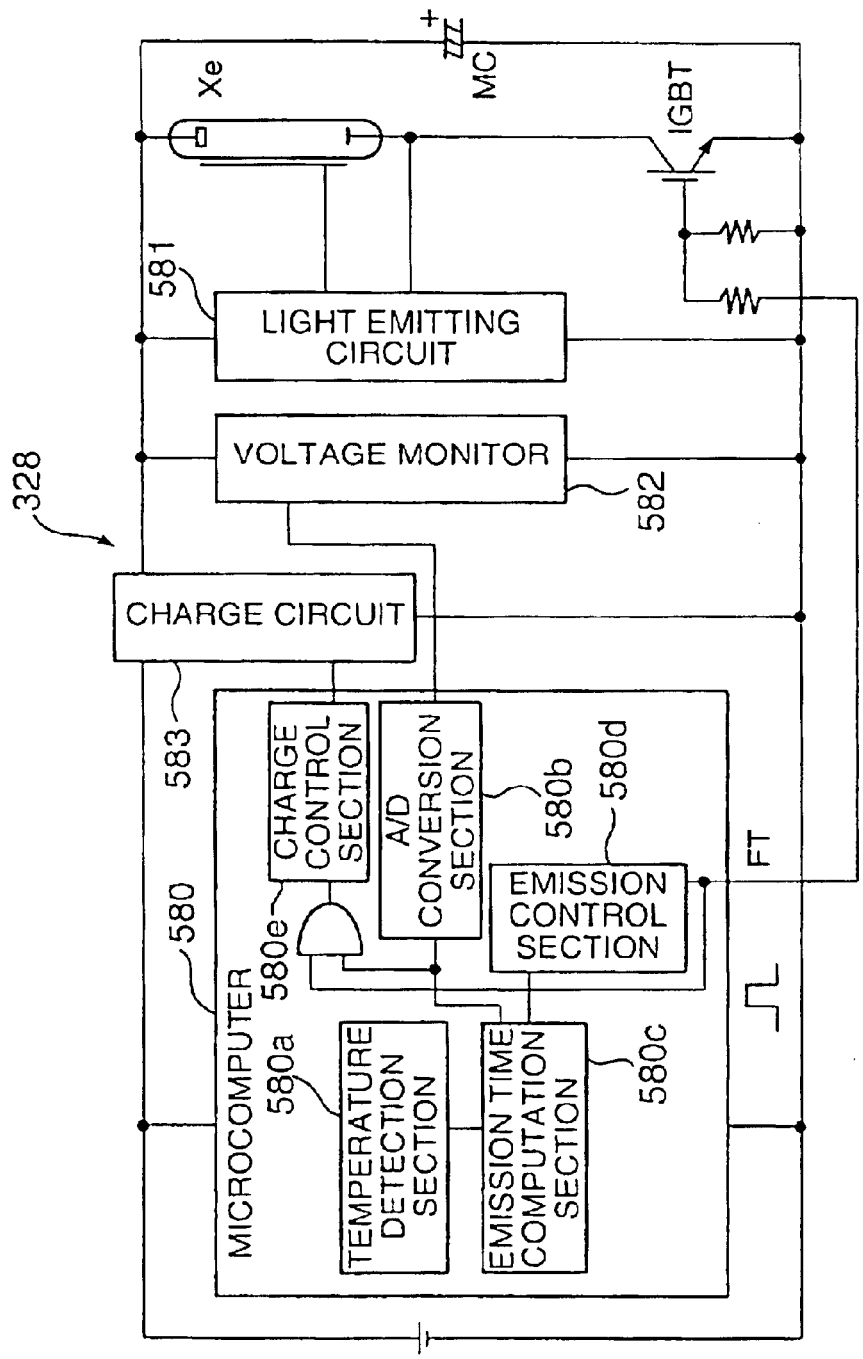
FIG. 9 is a diagram showing the internal configuration of a flash emission control section shown in FIG. 8.

FIG. 9 is a diagram showing the internal configuration of the flash emission control section 328.

As shown in FIG. 9, the flash emission control section 328 is provided with a microcomputer 580, a light emitting circuit 581 which supplies a trigger signal to a trigger electrode of a xenon tube Xe, the main capacitor MC for supplying electric power to the xenon tube Xe, a transistor IGBT which makes the xenon tube Xe emit flashing light according to an instruction from the microcomputer 580, and a voltage monitor 582 for monitoring the voltage across the main capacitor MC. The flash emission control section 528 is also provided with a charge circuit 583 for charging the main capacitor MC after emission of flashing light and in a case where the camera of this embodiment is left in an unused state for a long time. The xenon tube Xe, shown in FIG. 9, is placed in the flash emitting section 314 shown in FIG. 7.

The functions of internal sections of the microcomputer will be described with reference to FIG. 9.

The microcomputer 580 can be divided into functional sections: a temperature detection section 580*a* to which a detected temperature from the temperature sensor 590 is transmitted, an A/D conversion section 580*b* which converts a signal from the voltage monitor 582 into a digital signal, an emission time computation section 580*c* which obtains an emission time period on the basis of information including an amount of attenuation given from the control section 321 as well as a voltage and a temperature detected by the voltage monitor 582 and the temperature sensor 590, and an emission control section 580*d* which supplies to the gate of the transistor IGBT a signal FT according to the emission time period obtained by the emission time computation section 580*c*.

As shown in FIG. 9, the emission time computation section 580*c* is supplied with the voltage across the main capacitor detected by the voltage monitor, via the A/D conversion section 580*b*, and supplied with an amount of attenuation from the control section 321 shown in FIG. 8 as well as with a detected temperature from the temperature detection section 580*a*. The emission time computation section 580*c* obtains an emission time period on the basis of these information items. The emission time computation section 580*c* stores a computation expression for obtaining a reference emission time period on the basis of an amount of attenuation and an internal temperature. The computation expression stored is represented by an expression including a linear expression in each of temperature ranges and expressed by a polygonal line as a whole. In a section corresponding to part of amounts of attenuations and a red-eye phenomenon, a constant value is assigned in each temperature range. Each linear expression uses a detected temperature as a variable. When a detected temperature is given from the temperature detection section 580*a* to the emission time computation section 580*c*, an emission time period corresponding to the temperature is uniquely determined. Since there is a need to optimize the amount of flashing light by controlling the emission time period according also to the aperture at the time of light emission, the film speed and the subject distance, the time period is determined according to the above-mentioned amount of attenuation as well as to the temperature. A table in which the computation expression for obtaining an emission time period, which is stored in the emission time computation section 580*c*, is expressed is shown as Table 2.

A linear expression and constant values shown in each section of Table 2 are for obtaining a reference emission time Tf when the voltage across the main capacitor MC is at a predetermined reference voltage Vf.

[Table 2]

TABLE 2

| Amount of Attenuation (EV) | Emission Time Period ($\mu$s) | | | | | |
|---|---|---|---|---|---|---|
| | $-10°$ C. or lower | $-10$ to $-5°$ C. | $-5$ to $0°$ C. | 0 to $20°$ C. | 20 to $35°$ C. | $35°$ C. or higher |
| 0.0 | Y = 2000 | y = 2000 | y = 2000 | y = 2000 | y = 1000 | y = 800 |
| $-0.5$ | y = 2000 | y = 2000 | y = $-73.622$x + 724.39 | y = $-16.97$x + 724.39 | y = $-7.576$x + 536.52 | y = 260 |
| $-1.0$ | y = 750 | y = $-28.378$x + 324.93 | y = $-27.304$x + 330.3 | y = $-8.856$x + 330.3 | y = $-2.02$x + 193.58 | y = 120 |
| $-1.5$ | y = 470 | y = $-21.182$x + 151.51 | y = $-15.544$x + 179.7 | y = $-3.8295$x + 179.7 | y = $-1.1567$x + 126.24 | y = 82 |
| $-2.0$ | y = 290 | y = $-16.14$x + 54.6 | y = $-4.394$x + 113.33 | y = $-1.9925$x + 113.33 | y = $-0.8433$x + 90.347 | y = 60 |
| $-2.5$ | y = 180 | y = $-5.818$x + 75.76 | y = $-4.606$x + 81.82 | y = $-1.4015$x + 81.82 | y = $-0.6113$x + 66.017 | y = 43 |
| $-3.0$ | y = 120 | y = $-4.666$x + 54.7 | y = $-3.546$x + 60.3 | y = $-1.0265$x + 60.3 | y = $-0.3887$x + 47.543 | y = 35 |
| $-3.5$ | y = 85 | y = $-3.456$x + 41.96 | y = $-2.758$x + 45.45 | y = $-0.7195$x + 45.45 | y = $-0.3133$x + 37.327 | y = 25 |
| $-4.0$ | y = 70 | y = $-2.728$x + 31.81 | y = $-2.06$x + 35.15 | y = $-0.538$x + 35.15 | y = $-0.232$x + 29.03 | y = 21 |
| $-4.5$ | y = 53 | y = $-2.122$x + 24.84 | y = $-1.544$x + 27.73 | y = $-0.417$x + 27.73 | y = $-0.1813$x + 23.017 | y = 16.5 |
| $-5.0$ | y = 42 | y = $-1.622$x + 19.99 | y = $-1.242$x + 21.89 | y = $-0.314$x + 21.89 | y = $-0.1313$x + 18.237 | y = 13.5 |
| $-5.5$ | y = 34 | y = $-1.304$x + 15.6 | y = $-0.94$x + 17.42 | y = $-0.25$x + 17.42 | y = $-0.0907$x + 14.233 | y = 11 |
| $-6.0$ | y = 30 | y = $-0.97$x + 12.42 | y = $-0.734$x + 13.6 | y = $-0.1725$x + 13.6 | 10 | y = 9 |
| Red-eye | | y = 70 | | | y = 38 | y = 30 |

In Table 2, a plurality of emission time periods are shown with respect to combinations of two parameters, i.e., the EV value representing an amount of attenuation and the temperature detected by the temperature sensor, are shown. In Table 2, it is shown that an emission time period is individually determined with respect to each of the combinations. In this embodiment, when the control section 321 determines that there is a need to apply a suitable amount of light to the film by emitting flashing light for compensation of a deficiency of external light due to a low luminance of field, an amount of attenuation computed by the control section 321 is given as EV value to the flash emission control section 328. As this EV value representing an amount of attenuation, a numeral $-0.1$, $-0.2$ . . . is provided to indicate attenuation of the amount of flashing light according to an amount of attenuation obtained on the basis of the aperture diameter at the time of light emission, the film speed and the subject distance with respect to a reference (0.0) corresponding to the case of full emission performed by the flash emission control section 328. That is, in Table 2, it is shown that the amount of flashing light is reduced according to an amount of attenuation obtained by the control section 321 (see FIG. 8) in such a manner that the amount of light is reduced to ½ of the amount of light at the time of full emission if the EV value representing the amount of attenuation is $-1.0$, to ½ of the amount of light corresponding to the EV value $-1.0$ if the EV value is $-2.0$, . . . In the lowermost section, EV value $-2.8$ when the red-eye prevention mode is selected is also shown. When the red-eye prevention mode is selected, the control section 321 informs the shutter drive control section 323 that preliminary light emission will be performed, and the amount of attenuation at the time of preliminary light emission is shown as EV value $-2.8$.

For understanding of the method of adjustment of the emission time period on the basis of Table 2, the function of Table 2 will be described by using numeric values.

For instance, if the temperature detected by the temperature detection section 580a is 25° C. and if the EV value determined by the control section 321 is −3.0, an emission time period is obtained on the basis of a linear expression y=−0.3887×x+47.543. A temperature, 25° C. in this case is substituted for the symbol x in this linear expression to obtain 37.8255 μs as the symbol y, i.e., reference emission time period Tf. If the EV value is −3.0 and the temperature is −11° C., the reference emission time period Tf is a constant value of 120 μs.

If the temperature detected by the temperature sensor 590 is 25° C. When the red-eye prevention mode is selected and when preliminary light emission and main light emission are continuously performed, the emission time for preliminary emission is set to 38 μsec and preliminary light emission is continuously performed for this time period. Thereafter, if the EV value according to an amount of attenuation is, for example, −3.0, main light emission is performed for an emission time period determined by correcting, according to the voltage across the main capacitor detected immediately before the main light emission, the reference emission time period 37.8255 μs obtained by the linear expression corresponding to the EV value −3.0 and the temperature 25° C.

Thus, thirteen emission time periods (plus one emission time period for preliminary light emission in the red-eye prevention mode) are obtained with respect to amounts of attenuation, and each of these emission time periods can be adjusted further finely in six emission time periods according to a detected temperature.

After a reference emission time period has been determined on the basis of Table 2 as described above, a signal according to the reference emission time period in the case of the normal light emitting mode (in the case of main emission for the red-eye prevention mode, a signal according to an emission time period obtained by adjusting the reference emission time period according to the voltage across the main capacitor) is issued from the emission control section 580d to the transistor IGBT. The emission control section 580d issues an instruction to start light emission and issues an instruction to stop the light emission after a lapse of the emission time period obtained by the emission time computation section 580c from the moment at which the emission start instruction is issued.

FIG. 9 shows a flash emission instruction signal FT as a signal for this emission start instruction and as a signal for this emission stop instruction. The flash emission instruction signal FT acts as an instruction to start emission of flashing light when changing from a low-level state to a high-level state. After starting emission of flashing light, the flash emission instruction signal FT is maintained in the high-level state to continue the emission of flashing light for the emission time period. After this continuation, the flash emission instruction signal FT acts as an instruction to stop light emission when changing from the high-level state to the low-level state.

The main capacitor MC can be charged by the charge control section 580e after the instruction to stop light emission has been sent from the emission control section 580d in the microcomputer 580 to the transistor IGBT or when the voltage monitor 582 detects a state in which the voltage across the main capacitor MC is low after the camera has been left in an unused state for a long time period.

In the case of emission of flashing light for the reference emission time Tf obtained from Table 2 shown above, however, there is a possibility of the voltage across the main capacitor being reduced during continuous light emission or the like to such a level as to cause failure to maintain the desired amount of light at the time of main light emission.

Therefore, the camera of this embodiment is arranged to perform adjustment of the reference emission time Tf in such a manner that in a case where the voltage across the main capacitor MC detected immediately before main light emission after preliminary light emission is lower than a predetermined reference voltage, the emission time computation section 580c (see FIG. 9) adjusts the reference emission time Tf obtained on the basis of Table 2 by an amount corresponding to the reduction in the voltage across the main capacitor MC.

This adjustment method will be described with reference to FIG. 10.

Figure 10:
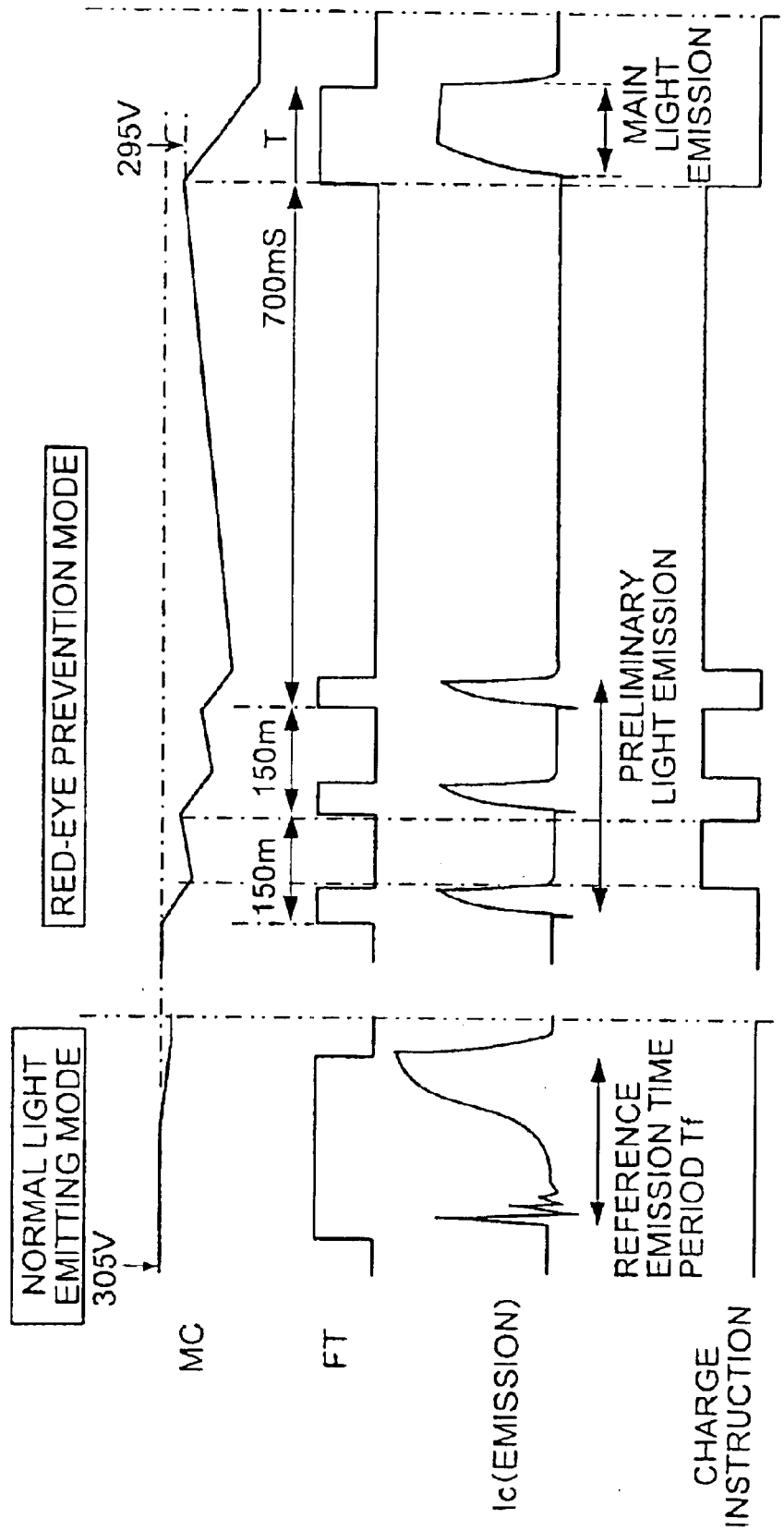
FIG. 10 is a waveform diagram showing the state of light emission of flashing light when preliminary light emission and main light emission are performed.

FIG. 10 comprises a waveform diagram showing the state of light emission in the normal light emitting mode and a waveform diagram showing the state of light emission when the red-eye prevention mode is selected and when preliminary light emission and main light emission are performed.

In FIG. 10, the state of the voltage across the main capacitor MC is indicated by symbol MC, the state of signal FT supplied from the emission control section 580d to the gate of the transistor IGBT is indicated by symbol FT, and the state of emission from the xenon tube is indicated by Ic (emission). Further, to show the manner in which charging is performed during emission of flashing light, a charge instruction issued from the charge control section 580e to the charge circuit 583 according to the operating conditions of the A/D conversion section 580b and the emission control section 580d is also shown. In the left-hand section of FIG. 10, a waveform indicating the state of emission of flashing light when flashing light is emitted in the normal light emitting mode is shown at Ic (emission). At this time, the voltage across the main capacitor MC is at a predetermined voltage of 305 V and flashing light is emitted for the reference emission time period Tf based on Table 2. In FIG. 10, the state of a flash emission instruction is represented by the signal FT output from the emission control section 580d to the IGBT, and the state in which flashing light emitted by the operation of IGBT according to the signal FT is represented by Ic (emission). As shown in FIG. 10, the signal FT is set high level during the reference emission time period Tf to emit flashing light. After emission of flashing light, the charge instruction (not shown) is sent from the charge control section 580e to the charge circuit 583 to perform charging.

In the right-hand section of FIG. 10, a waveform diagram showing the state of light emission when the red-eye prevention mode is selected and when preliminary light emission and main light emission are performed is shown.

When the red-eye prevention mode is selected, preliminary light emission is intermittently performed three times and main light emission is performed after 700 ms from the end of preliminary emission. When preliminary light emission is intermittently performed and when transition to main light emission is made, to bring the voltage of the main capacitor MC to near 305 V, the charge instruction (the high-level state corresponding to charging) is issued from the charge control section 580e to the charge circuit 583 to perform charging. Charging is performed when the signal representing the charge instruction is in the high-level state.

Thus, charging is frequently performed to maintain the voltage across the main capacitor MC. However, the voltage across the main capacitor MC at the time of main light emission does not reach the reference voltage 305 V. In FIG. 10, a voltage of 295 V is indicated as a voltage value reached but lower than the reference voltage. In the case of light emission for the reference emission time period Tf based on Table 2 when the voltage across the main capacitor MC is 295 V, a deficiency of the amount of light occurs.

In the camera of this embodiment, the voltage reached but lower than the reference voltage is detected by the voltage monitor 582, an emission time period T is obtained on the basis of the detected voltage, i.e., 295 V in this embodiment, and main light emission is performed after adjusting the emission time period.

Further description will be made with respect to concrete examples of numeric values shown in FIG. 10. After preliminary light emission for prevention of red-eye phenomenon has been repeated three times at intervals of 150 ms, for example, for an emission time of 38 μsec based on Table 2, charging is performed for 700 ms. The voltage across the main capacitor MC is thereby increased only to 295 V. Even in such a case, it is necessary to perform main light emission. However, if flashing light is emitted for the same time period as the reference emission time Tf based on Table 2 when the voltage across the main capacitor is 295 V, a deficiency of the amount of light occurs. In Table 2, the reference emission time Tf when the voltage across the main capacitor MC is equal to the reference voltage, 305 V in this embodiment is shown. To compensate for this deficiency of the amount of light, an emission time period T is obtained by the emission time computation section 580c by an equation shown below, such that the same amount of light as that in the case of emission of flashing light for the predetermined reference emission time period Tf when the voltage across the main capacitor MC is equal to the predetermined reference voltage Vf, 305 V in this embodiment can be obtained.

If Tf is a reference emission time period; Vf is a reference voltage, 305 V in this embodiment; V is a detected voltage, 295 V in this embodiment; t0 is a constant corresponding to a time delay from a moment at which an emission start instruction is issued to a moment at which light emission is started; and T is an emission time period, emission time period T is obtained by $$T=(Tf-t0)\times(Vf/V)+t0 \quad (1)$$

This equation (1) expresses adjustment of the emission time period by proportioning of the reference voltage and the detected voltage (305 V/295 V).

As shown by this equation (1), an emission time period is obtained by considering the time period for the process in which the trigger signal is supplied from the light emitting circuit 581 to the xenon tube Xe when the flash emission instruction signal FT is supplied from the emission control section 580d to the transistor IGBT, the xenon tube Xe is triggered to excite xenon gas, and transition to arc discharge in the xenon tube Xe is made. It is assumed that in the camera of this embodiment this time period t0 before a start of arc discharge is 2 to 7 μsec and some value in 2 to 7 μsec according to the characteristics of the flash emission control section 328 including the xenon tube Xe is stored in a register or the like in the emission time computation section 580c.

Description will be given with reference to FIG. 11 as to how flashing light is emitted after adjustment of emission time T by equation (1).

Figure 11:
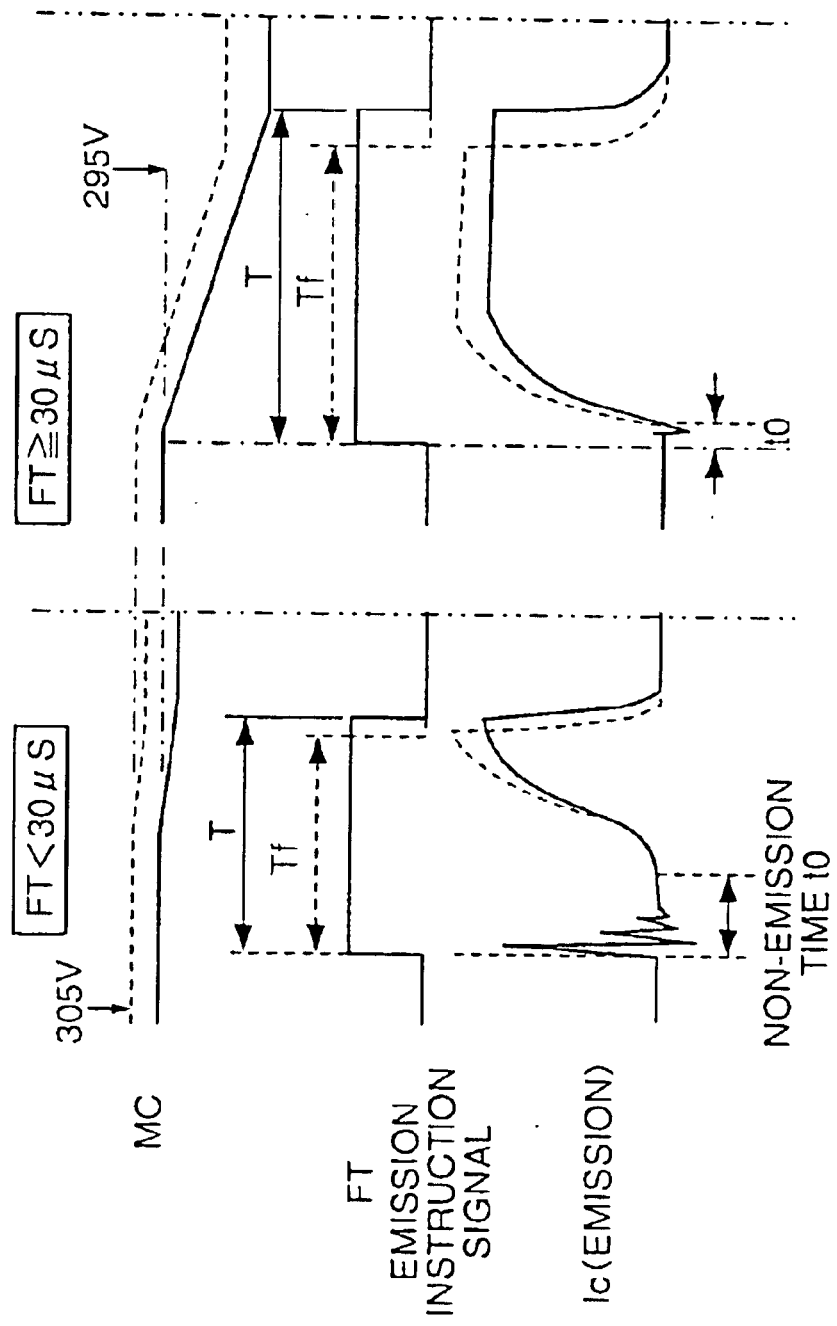
FIG. 11 is a diagram formed by extracting the portion of FIG. 10 showing main light emission in the state of emission shown in FIG. 10.

FIG. 11 is a diagram formed by extracting the portion of FIG. 10 showing main light emission in the state of emission shown in FIG. 10.

In FIG. 11, the same reference voltage and the same main capacitor voltage as those shown in FIG. 10, i.e., the reference voltage V, which is 305 V in this embodiment, and the detected voltage across the main capacitor MC, which is reduced by preliminary light emission, and which is 295 V in this embodiment, are also shown. In the left-hand section of FIG. 11, it is shown that when the reference emission time period Tf is shorter than a predetermined emission time period of 30 μsec, the influence of the non-emission time period t0 corresponding to the delay time on the entire emission is large. To reduce this influence, an emission time period is computed in the emission time computation section 580c by using equation (1) and by considering the non-emission time period t0 (minutes) corresponding to the delay time. In FIG. 11, a waveform in the case of emission of flashing light for the emission time period computed by equation (1) is indicated by the solid line, and a waveform in the case of emission of flashing light for the reference emission time period Tf when the reference voltage V is V=305 V is indicated by the dotted line. As indicated by the solid line in FIG. 11, the emission time period is extended by an amount relating to the reduction in the voltage across the main capacitor MC by using equation (1). The same amount of light as the amount of emitted flashing light in the case where the voltage across the main capacitor is equal to the reference voltage is thereby obtained.

In this manner, the xenon tube Xe can be made to emit flashing light for the emission time period determined by considering the time period t0 corresponding to the delay time as well as the detected voltage across the main capacitor MC, from a time at which the predetermined aperture diameter is reached by drive of the shutter having the function of setting the aperture.

In the right-hand section of FIG. 11, a waveform indicating the state of emission of flashing light for a time period equal to or longer than the predetermined time period 30 μsec is shown. The scale of the time axis (abscissa) in this section is different from that in the waveform diagram on the left-hand side.

The waveform indicated by the dotted line in FIG. 11 corresponds to emission of flashing light for the reference emission time period Tf at the reference voltage, and the waveform indicated by the solid line corresponds to emission of flashing light for the emission time period T adjusted on the basis of the voltage across the main capacitor. It can be understood that in the case of this light emission the non-emission time period t0 corresponding to the delay is a short time period observed at a rise of the waveform in a small proportion to the entire emission time and it does not largely contribute to the entire emission time. When the reference emission time Tf is 30 μs or longer, the difference between the emission time period obtained by equation (1) and the emission time period obtained by equation (2) is not significantly large. Therefore, when the reference emission time Tf is longer than a predetermined time period T1, 30 μs in this embodiment, the delay time t0 is omitted and the emission time period T is simply computed by $$T=Tf\times(Vf/V) \quad (2)$$

In this manner, the computation in the emission time computation section 580c is simplified to reduce the load on the emission time computation section 580c when flashing light is emitted for a time period longer than the predetermined time period T1, 30 μs in this embodiment.

The present invention has been described with respect to the construction of a camera having a shutter having the function of setting an aperture. However, the present invention may be applied to any other camera, e.g., one in which an aperture and a shutter are provided separately from each other, and one in which an aperture separated provided can be changed in multiple steps.

While the camera of each embodiment has been described as a type of camera for photography on a photographic film, the present invention can be applied to another type of camera having an image pickup device and capable of generating image data by forming a subject image on the image pickup device.

What is claimed is:

1. A camera which takes a picture of a subject, the camera comprising:

a flash emission device which emits flashing light in synchronization with a picture-taking operation, and which controls the amount of emitted light by selecting an emission time period, the flash emission device having:

a temperature sensor which detects temperature;

a storage section which stores a computation expression by which an emission time period for obtaining a predetermined amount of emitted light is obtained by using temperature as a variable; and an emission control section which obtains an emission time period from the temperature obtained from the temperature sensor on the basis of the computation expression, and which controls the emission time period so that light is emitted only for the obtained emission time period.

2. The camera according to claim 1, wherein the computation expression is represented by an expression including a linear expression in each of temperature ranges and expressed by a polygonal line as a whole.

3. A camera which takes a picture of a subject, the camera comprising:

a flash emission device which performs preliminary light emission before a picture-taking operation, and which performs main light emission in synchronization with the picture-taking operation, the flash emission device having:

a main capacitor in which charge for emission of flashing light is accumulated;

a light emitting section which emits flashing light by receiving electric power from the main capacitor;

a voltage monitor which detects the voltage across the main capacitor before the main light emission;

an emission time computation section which obtains, on the basis of the detected voltage obtained by the voltage monitor, an emission time period such that the same amount of light as the amount of light when light is emitted for a predetermined reference emission time period when the voltage across the main capacitor is equal to a predetermined reference voltage can be obtained; and an emission control section which controls light emission so that flashing light is emitted only for the emission time period obtained by the emission time computation section.

4. The camera according to claim 3, wherein an aperture at the time of main light emission is variable, and the reference emission time period is a time period according to the aperture at the time of main light emission.

5. The camera according to claim 3, further comprising a temperature sensor which detects temperature, wherein the reference emission time period is a time period according to the temperature detected by the temperature sensor.

6. The camera according to claim 3, further comprising a distance sensor which detects a subject distance, wherein the reference emission time period is a time period according to the subject distance detected by the distance sensor.

7. The camera according to claim 3, wherein the emission time computation section stores a computation expression by which the reference emission time period is obtained.

8. The camera according to claim 7, wherein if the reference emission time period is Tf; the reference voltage is Vf; the detected voltage is V; a constant corresponding to a time delay from a moment at which an emission start instruction is issued to a moment at which light emission is started is t0; and the emission time period is T, the emission time computation section obtains the emission time period T by $$T = (Tf - t0) \times (Vf/V) + t0 \qquad (1).$$

9. The camera according to claim 8, wherein when the emission time period Tf is longer than a predetermined time period T1 of 30 $\mu$sec or longer, the emission time computation section obtains the emission time period T by $$T = Tf \times (Vf/V) \qquad (2)$$

instead of the equation (1).

* * * * *